(12) United States Patent
Kim et al.

(10) Patent No.: US 9,649,870 B2
(45) Date of Patent: May 16, 2017

(54) INJECTION-MOLDED PRODUCT HAVING THREE-DIMENSIONAL SECURITY ELEMENT AND PRODUCTION METHOD THEREFOR

(71) Applicants: KOREA MINTING, SECURITY PRINTING & ID CARD OPERATING CORP., Daejeon (KR); 3SMK CO., LTD., Miryang-si, Gyeongsangnam-do (KR)

(72) Inventors: Jong-Jae Kim, Daejeon (KR); Sung-Hyun Joo, Daejeon (KR); Byeong-Hun Park, Daejeon (KR); Myung-Seuk Kang, Miryang-si (KR)

(73) Assignees: Korea Minting, Security Printing & ID Card Operating Corp., Daejeon (KR); 3SMK Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 14/374,440

(22) PCT Filed: Jan. 31, 2013

(86) PCT No.: PCT/KR2013/000813
§ 371 (c)(1),
(2) Date: Jul. 24, 2014

(87) PCT Pub. No.: WO2013/115587
PCT Pub. Date: Aug. 8, 2013

(65) Prior Publication Data
US 2014/0376088 A1    Dec. 25, 2014

(30) Foreign Application Priority Data
Feb. 3, 2012 (KR) .................. 10-2012-0011341

(51) Int. Cl.
*G02B 27/22* (2006.01)
*B29C 45/00* (2006.01)
(Continued)

(52) U.S. Cl.
CPC ...... *B42D 25/342* (2014.10); *B29D 11/00298* (2013.01); *B42D 25/21* (2014.10);
(Continued)

(58) Field of Classification Search
CPC . B29C 45/0001; B29C 45/00; B29C 45/0025; B29C 45/26; B29C 39/00; B29C 45/14811; B29C 45/16; B29C 49/221
(Continued)

(56) References Cited

U.S. PATENT DOCUMENTS 6,508,902 B2 * 1/2003 Lind .................. G09F 3/04
156/245
6,635,196 B1 * 10/2003 Goggins ........... B29C 45/14688
264/1.7
(Continued)

FOREIGN PATENT DOCUMENTS

JP    2001-187496 A    7/2001
KR    10-2005-0011595 A    1/2005
(Continued)

*Primary Examiner* — Jade R Chwasz
(74) *Attorney, Agent, or Firm* — The Webb Law Firm

(57) ABSTRACT

A method for producing a three-dimensional security element and an injection-molded product having the three-dimensional security element and, more specifically, to a method for producing a three-dimensional security element suitable for an in-mold process by using a moiré expansion phenomenon, and for producing an injection-molded product to which the three-dimensional security element is applied. The present invention according to one embodiment comprises a three-dimensional security element and an injection-molded product having the three-dimensional
(Continued)

security element, wherein the three-dimensional security element further comprises: a micro lens array to which various types of lenses can be applied; an image array; a primer layer for facilitating adhesion; and a projection film for protecting the three-dimensional security element from heat and pressure. According to the configuration above, three-dimensional effects can be implemented, such as a latent image effect, a floating effect, and an inverted parallax effect, wherein an effect is determined by a period rate and a matching angle between the micro lens array and the image array.

8 Claims, 4 Drawing Sheets

(51) Int. Cl.
| | | |
|---|---|---|
| B29C 47/00 | (2006.01) | |
| B32B 37/00 | (2006.01) | |
| B29B 7/00 | (2006.01) | |
| B42D 25/342 | (2014.01) | |
| B42D 25/21 | (2014.01) | |
| B29D 11/00 | (2006.01) | |
| B42D 25/29 | (2014.01) | |
| G02B 3/00 | (2006.01) | |
| B29L 11/00 | (2006.01) | |
| B29C 45/14 | (2006.01) | |
| B29C 45/37 | (2006.01) | |
| G02B 1/10 | (2015.01) | |

(52) U.S. Cl.
CPC ........... *B42D 25/29* (2014.10); *G02B 3/0012* (2013.01); *G02B 3/0056* (2013.01); *G02B 27/2214* (2013.01); *B29C 45/14811* (2013.01); *B29C 45/37* (2013.01); *B29L 2011/0016* (2013.01); *B42D 2033/24* (2013.01); *B42D 2035/20* (2013.01); *B42D 2035/44* (2013.01); *G02B 1/105* (2013.01)

(58) Field of Classification Search
USPC .............. 264/500, 513, 297.2, 297.8, 328.1; 359/463, 466, 477, 900
See application file for complete search history.

(56) References Cited

U.S. PATENT DOCUMENTS 7,075,725 B2 * 7/2006 Tomczyk ............... G03B 35/24
  235/487
7,153,555 B2 * 12/2006 Raymond ......... B29C 45/14688
  428/34.1

FOREIGN PATENT DOCUMENTS

KR  10-2009-0013740 A  2/2009
KR  10-2009-0066826 A  6/2009

* cited by examiner

INJECTION-MOLDED PRODUCT HAVING THREE-DIMENSIONAL SECURITY ELEMENT AND PRODUCTION METHOD THEREFOR

TECHNICAL FIELD

The present invention relates to an injection-molded product having a security element for forgery prevention related to forgery prevention technology, and a method of producing the injection-molded product.

BACKGROUND ART

Recently, with the development of mobile devices, the number of forged products has rapidly increased. Since forged products are too elaborate for even experts to identify, the losses of consumers who purchase forged products while mistaking them for genuine products are considerable. The problem with this is that it is difficult to distinguish between genuine products and forged products in terms of appearance. Although enterprise-level efforts to develop technology for overcoming the above problem have been made, effective results cannot be achieved due to problems, such as costs required for research into security technology and the application thereof, and equipment required to determine whether or not a product has been forged. Accordingly, there is urgency for the development of new security technology for dealing with the gradually increasing number of forged products.

As one of the new security technologies for overcoming the above problem, there is a technology using a moiré phenomenon. A moiré phenomenon is a phenomenon in which two regular successive patterns overlap each other and thus another pattern appears. In the field of displays, technology has been developed toward the direction in which a moiré phenomenon is prevented from occurring. In contrast, in the field of security, there have been attempts to utilize the moiré phenomenon as a new forgery prevention element. However, currently, most of these technologies have their limitations in that application targets are limited to paper media or the like, or are problematic in that their effectiveness is deteriorated due to the advent of highly precise forging techniques. As a result, there is an urgent need for the provision of countermeasures against these problems.

DISCLOSURE

Technical Problem

An object of the present invention is to produce a three-dimensional security element that cannot be forged thanks to its high security level, can be easily verified, can be conveniently used, and can be accurately identified.

Another object of the present invention is to provide a process of producing an injection-molded product to which the above-described three-dimensional security element has been applied, and to also provide the results of the process.

Technical Solution

In order to accomplish the above objects, the present invention provides a method of producing an injection-molded product having a three-dimensional security element, including a metallic circular plate fabrication step of exposing micro patterns of an image array and a micro-lens array to a laser or electron beam on a glass plate onto which a photoresist has been applied and performing developing and electro-forming processes, thereby fabricating a metallic circular plate; a micro pattern formation step of forming the image array and the micro-lens array on opposite surfaces of a base material using an ultraviolet-curable resin and the metallic circular plate; an image array highlighting step of filling a surface on which the image array has been formed with ink or vacuum-depositing ink on the surface in order to more clearly represent the image array; a step of coating the surface on which the image array has been formed with a primer layer in order to facilitate affixation with the injection-molded product; a step of attaching a protective film in order to protect the micro-lens array from heat and pressure applied in an injection process; and an injection molding step of producing an injection-molded product having a predetermined shape using the three-dimensional security element via an in-mold injection process.

Furthermore, the present invention provides an element, including a base material; a micro-lens array formed on one surface of the base material, and configured such that a plurality of lenses in a refractive, diffractive and GRIN (Gradient Index) form are arranged in a 2D array; an image array formed on the opposite surface of the base material, and configured such that various patterns or images are arranged in a 2D form; a primer layer applied onto one surface of the image array, and configured to facilitate affixation with the injection-molded product; and a protective film affixed to one surface of the micro-lens array and configured to protect the lenses from heat and pressure.

Advantageous Effects

The three-dimensional security element according to an embodiment of the present invention is advantageous in that its effect of preventing the forgery of a product is excellent because it is produced using a micro pattern fabrication process and a pattern matching process and thus the imitative production thereof is impossible. Furthermore, when the three-dimensional security element is attached to an injection-molded product using an in-mold injection molding process, rather than a method used for paper media, this method has a few advantages compared to other methods. These advantages include: the flexibility of design, the implementation of multiple colors, a three-dimensional effect and texture by means of a single task, manufacturing productivity attributable to long-lasting graphics, and a reduction in system cost.

Furthermore, a visually very effective eye-catching effect can be achieved because, in using the security element, a forgery prevention effect is not only achieved but also a magnified three-dimensional image delivers the sensation of depth and a moving shape appears according to an angle of observation.

When the three-dimensional security element is applied to various types of products, such as a mobile device, a home appliance product and parts, an injected card or an identification card, a highly reliable forgery prevention effect can be achieved because its security and ease of identification are excellent. Furthermore, the three-dimensional security element is more effective in the prevention of crimes because it can be easily verified using unassisted vision.

BEST MODE

Embodiments of the present invention are described in detail below with reference to the accompanying drawings. The terms used herein are terms that have been selected by taking into account functions in the embodiments. The meanings of the terms may vary depending on the intentions of a user or an operator or habitual practice. Therefore, the meanings of the terms used in the following embodiments should follow definitions when the meanings of the terms are more specifically defined in the specification, or should be interpreted as having the meanings that are generally recognized by those skilled in the art when there are no specific definitions. Furthermore, when a first material layer is described as being formed on a second material layer in the specification, this should be interpreted as including not only the case where the first material layer is formed directly on the second material layer but also the case where a third material layer is interposed between the second material layer and the first material layer, unless there is a clear exclusive description.

A forgery prevention apparatus according to the present invention relates to a three-dimensional security element. The three-dimensional security element is implemented to represent a dynamic three-dimensional image using an optically unique phenomenon called moiré magnification.

Figure 1:
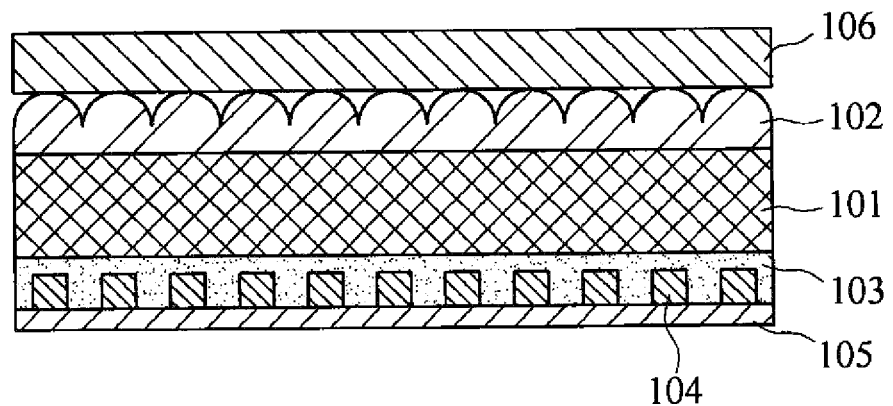
FIG. 1 is a sectional view illustrating an example of a three-dimensional security element according to the present invention.

FIG. 1 is a sectional view illustrating an example of a three-dimensional security element according to the present invention.

Referring to FIG. 1, the three-dimensional security element includes a base material 101, a micro-lens array 102 located on one surface of the base material 101, an image array 103 located on the opposite surface of the base material 101, a primer layer 105 applied to one surface of the image array 103, and a protective film 106 attached onto the top of micro-lens array 102.

The base material 101 is interposed between the micro-lens array 102 and the image array 103. The base material 101 functions as the body of the three-dimensional security element, and has a transparent property. The base material 101 is made of transparent plastic material, such as polyethylene terephthalate, polycarbonate, polyvinyl chloride, polypropylene, or the like.

Figure 2:
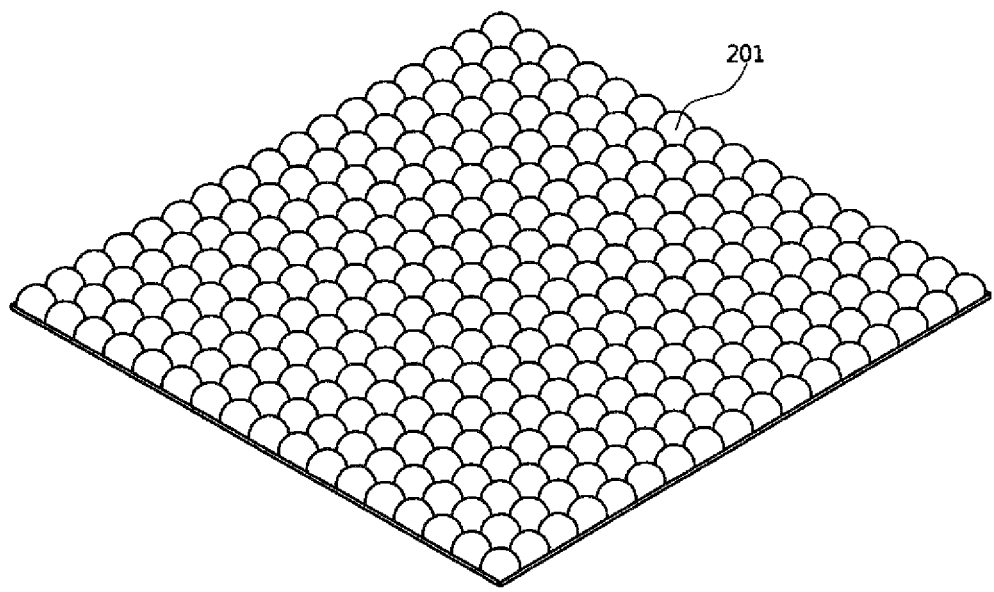
FIG. 2 is an enlarged perspective view illustrating an example of a micro-lens array.

FIG. 2 is an enlarged perspective view illustrating an example of the micro-lens array.

The micro-lens array 102 is located on one surface of the base material. A plurality of micro-lenses 201 having a micro size has a two-dimensional (2D) plane array. This array may be configured in the form of any one of 2D Bravais lattices, such as a square array, a rectangular array, a hexagonal array, and a parallelogram array. In order to make the best use of a sectional three-dimensional security film according to the present invention, it is preferable that the diameter of the micro images 301 is equal to or smaller than 100 μm. It is more effective if the diameter is equal to or smaller than 20 μm. It is also preferable that the pitch between the micro images 301 is equal to or smaller than 100 μm. In an example of the micro-lenses 201, moiré-magnified images are formed in a direction above the micro-lens array 102 through the image formation function of the lenses using refractive lenses. However, the micro-lenses 201 according to an embodiment of the present invention are not limited to refractive types, but may include all optical systems having image formation functionality, such as diffractive lenses and Gradient Index (GRIN) lenses.

Figure 3:
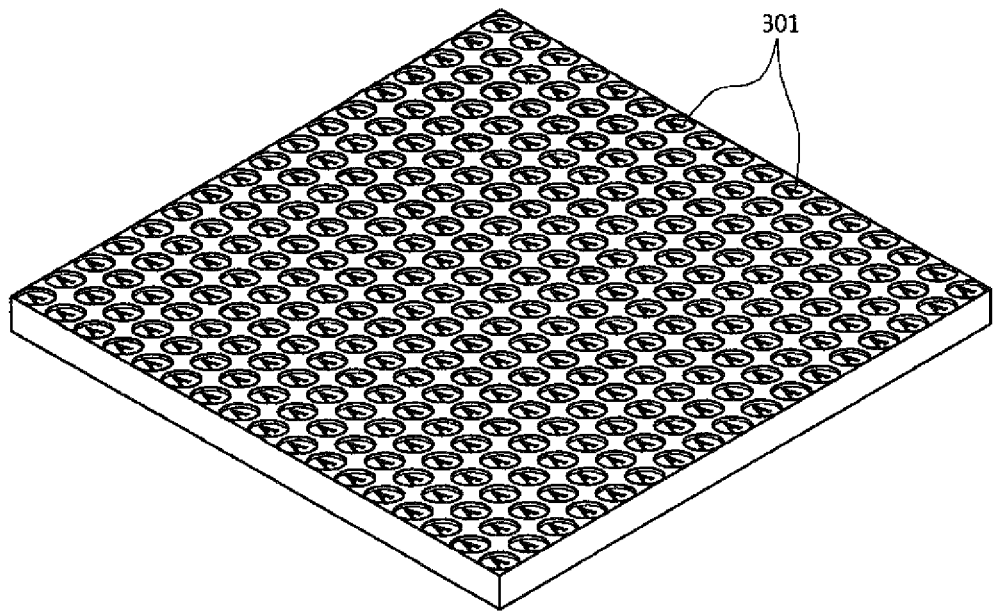
FIG. 3 is an enlarged perspective view illustrating an example of an image array.

FIG. 3 is an enlarged perspective view illustrating an example of the image array.

The image array 103 is located on the opposite surface of the base material 101. A plurality of micro images 301 formed in the image array 103 has a 2D plane array. The array may be configured in the form of any one of 2D Bravais lattices, such as a square array, a rectangular array, a hexagonal array, and a parallelogram array. Desired various types of images, such as figures, characters, logos, etc may be applied to the images 301 of the image array 103. In order to make the best use of a sectional three-dimensional security film according to the present invention, it is preferable that the diameter of the micro images 301 is equal to or smaller than 100 μm. It is more effective if the diameter is equal to or smaller than 20 μm. It is also preferable that the pitch between the micro images 301 is equal to or smaller than 100 μm. It is more effective if the pitch is equal to or smaller than 20 μm.

The image array 103 may be highlighted by adding a colored layer 104 to the images of the image array 103. In order to enable the micro images 301 of the image array 103 to be more clearly viewed, it is preferable to add a separate color to the image portions. The colored layer 104 functions to highlight the image array 103 by adding a color to the images 301.

The primer layer 105 is located on the image array 103. Since the three-dimensional security element and the injection-molded product may have different materials, it is not easy to affix them to each other when the three-dimensional security element is applied to the injection-molded product. The primer layer 105 is a part that enables the three-dimensional security element and the injection-molded product to be easily affixed to each other therebetween. The effect of highlighting images, which is the same as that of the colored layer 104, can be obtained by adding a color to the resin that forms the primer layer. Furthermore, a security effect based on the property of ink may be added by adding various types of special material, such as fluorescent ink, infrared ink, magnetic ink, phosphorescent ink, or color shifting ink, to the resin that forms the primer layer.

The protective film 106 is located on the micro-lens array and made of heat-resistant material; and functions to protect the three-dimensional security element from external heat and pressure. In the present invention, when the three-dimensional security element is applied to the injection-molded product, in-mold injection molding is used. In an in-mold injection molding process, the three-dimensional security element is subjected to heat and pressure. The micro-lenses 201 may be damaged by such heat and pressure. When the micro-lenses 201 are damaged, a correct three-dimensional image effect cannot be achieved. The protective film 106 protects the micro-lenses 201 that are attached to the micro-lens array 102.

Figure 4:
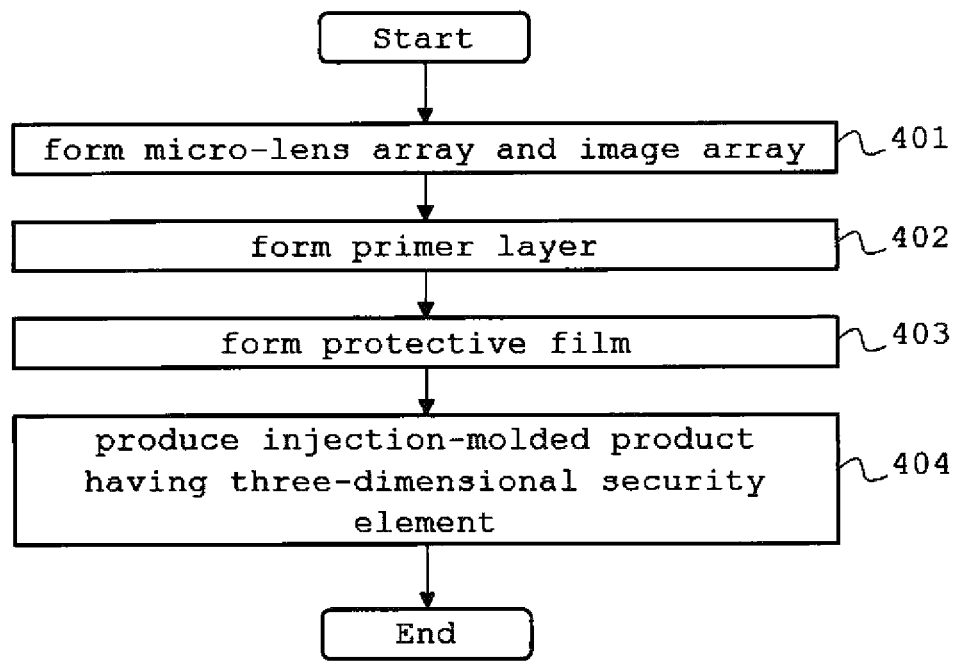
FIG. 4 is a flowchart illustrating a method of producing an injection-molded product having a three-dimensional security element according to an embodiment.

FIG. 4 is a flowchart illustrating a method of producing an injection-molded product having a three-dimensional security element according to an embodiment.

Referring to FIG. 4, in the process of producing an injection-molded product having a three-dimensional security element, first, a base material that functions as the body of a three-dimensional security element is prepared. A micro-lens array is formed on one surface of the base material and an image array is formed on the opposite surface of the base material at step 401. Thereafter, primer layer is formed by coating the image array with a primer at step 402, and a protective film is attached to the micro-lens array at step 403. An injection-molded product having a predetermined shape is produced using the three-dimensional security element, fabricated in the above-described process, via an in-mold injection process at step 404.

Figure 5:
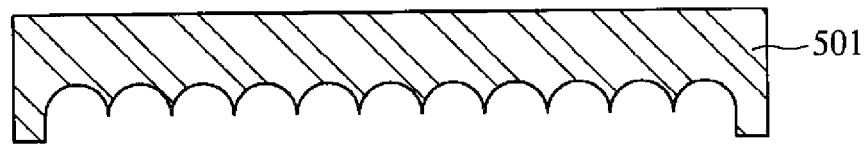
FIG. 5 is a sectional view of a first metallic circular plate that has a shape opposite to that of the micro-lens array according to an example.

FIG. 5 is a sectional view of a first metallic circular plate 501 that has a shape opposite to that of the micro-lens array according to an embodiment.

First, the metallic circular plate for forming the micro-lens array is fabricated. In the process of fabricating a metallic circular plate, first, a glass substrate is prepared, and a photoresist, which is a light-sensitive material, is applied to one surface of the glass substrate. Micro patterns having a shape opposite to that of the micro-lens array are exposed to a laser or electron beam on the glass substrate on which the photoresist film has been formed. Photoresist patterns are formed using the developing process of melting the exposed portions by injecting a developing solution into the photoresist film on which the micro patterns have been exposed. The metallic circular plate of the micro-lens array is fabricated using the photoresist patterns, formed as described above, using an electro-forming process. Referring to FIG. 5, a metallic circular plate fabricated according to an example of the micro-lens array in the present invention is illustrated. In the present invention, the metallic circular plate is named the first metallic circular plate 501.

Figure 6:
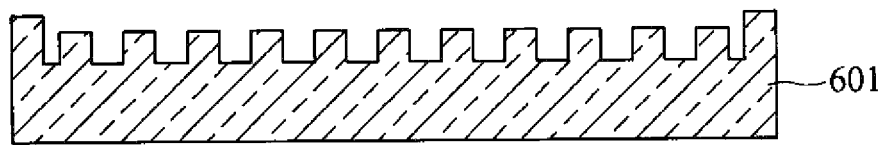
FIG. 6 is a sectional view of a second metallic circular plate having a shape opposite to that of the image array according to an example.

FIG. 6 is a sectional view of a second metallic circular plate 601 having a shape opposite to that of the image array according to an embodiment.

A metallic circular plate having a shape opposite to that of the image array is fabricated using a process identical to the above-described process of fabricating the first metallic circular plate. In the present invention, the metallic circular plate fabricated based on the example of the image array is named the second metallic circular plate 601.

Figure 7:
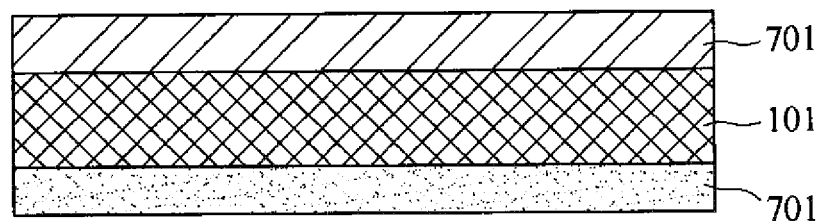
FIG. 7 is a sectional view of a base material to which an ultraviolet-curable resin has been applied according to an embodiment.

FIG. 7 is a sectional view of the base material 101 to which an ultraviolet-curable resin 701 has been applied according to an embodiment.

Figure 8:
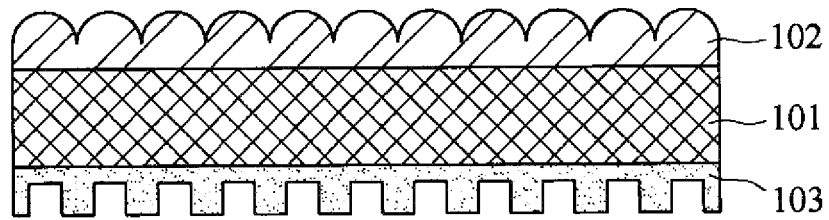
FIG. 8 is a sectional view of a three-dimensional security element in which a micro-lens array and an image array have been formed according to an embodiment.

FIG. 8 is a sectional view of a three-dimensional security element in which the micro-lens array 102 and the image array 103 have been formed according to an embodiment.

Referring to FIGS. 7 and 8, first, a base material is prepared, and an ultraviolet-curable resin is applied to the base material. The ultraviolet-curable resin 701 is pressed using the metallic circular plate (first metallic circular plate) of the micro-lens array fabricated using the above-described process of fabricating a metallic circular plate, and is cured using ultraviolet rays. Micro patterns formed on the first metallic circular plate 501 are transferred to the ultraviolet-curable resin 701, and thus the micro-lens array 102 is formed.

The image array is formed on the opposite surface of the base material 101 using the second metallic circular plate via a process identical to the above-described process. With regard to the sequence of formation, the micro-lens array 201 and the image array 103 may be sequentially formed on the surfaces, or the two arrays may be simultaneously formed on the two surfaces. Furthermore, in order to implement clearer three-dimensional images, it is preferable that the base material 101, the micro-lens array 102 and the image array 103 are all transparent.

The micro patterns formed on the micro-lens array 102 and the image array 103 have a 2D plane array. The array may be configured in the form of any one of 2D arrays, such as a square array, a rectangular array, a hexagonal array, and a parallelogram array.

An injection-molded product, which is an affixation target, may have not only a plane surface but also a curved surface. Upon designing the micro-lens array and the image array, a three-dimensional security element suitable for the shape of an injection-molded product can be fabricated through reverse engineering assumed by taking into account the curvature radius of an affixation target injection-molded product. Through this, three-dimensional images can be observed even in a curved injection-molded product without suffering from image distortion.

Figure 9:
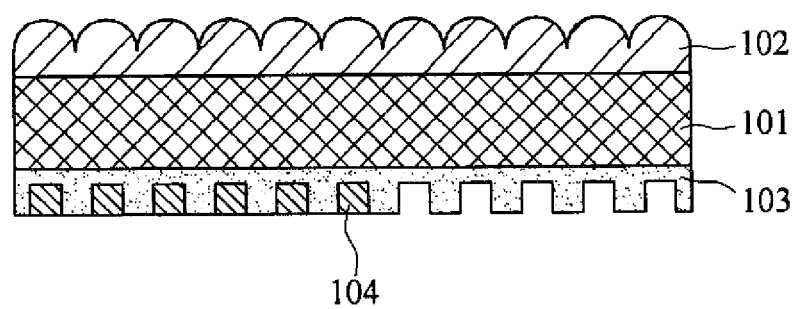
FIG. 9 is a sectional view of a three-dimensional security element in which a colored layer has been formed according to an embodiment.

FIG. 9 is a sectional view of a three-dimensional security element in which a colored layer has been formed according to an embodiment.

The three-dimensional security element is configured such that images of the image array 103 are formed via the micro-lenses. In this case, in order to enable the images to be more clearly viewed, it is advantageous to add a separate color to the image portions. Referring to FIG. 9, the colored layer 104 may be added by filling the depressed portions of the images of the image array 103 with ink or adding a separate coating layer through vacuum deposition. The added colored layer 104 functions to highlight the images.

Figure 10:
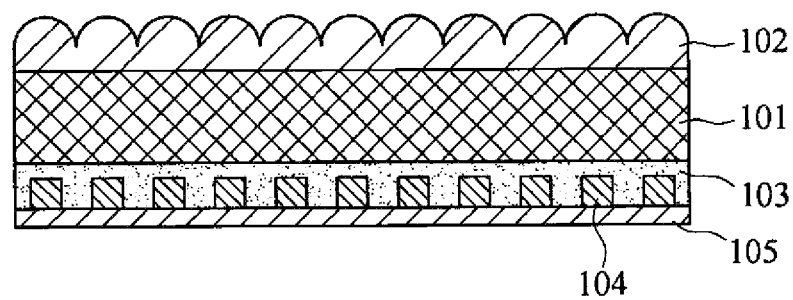
FIG. 10 is a sectional view of a three-dimensional security element in which the primer layer 105 has been formed according to an embodiment.

FIG. 10 is a sectional view of a three-dimensional security element in which the primer layer 105 has been formed according to an embodiment.

Referring to FIG. 10, the primer layer 105 is formed by applying a primer onto the image array 103 of the three-dimensional security element. The primer layer enables an injection-molded product and the three-dimensional security element to be smoothly affixed to each other in the process of applying the three-dimensional security element to the injection-molded product, and also can protect the three-dimensional security element from light erosion or physical impact. Furthermore, according to an embodiment invention, the effect of highlighting images similar to the effect of the image highlighting step can be achieved by adding various colors to the primer.

The injection-molded product is shaped by injecting a thermoplastic resin and then applying heat and pressure. When the three-dimensional security element according to an embodiment of the present invention is inserted into an injection mold and affixed to the injection-molded product, the three-dimensional security element may be damaged by heat and pressure that is generated in an injection process. In particular, when the micro-lenses are deformed and damaged, an error occurs in the formation of images, thereby preventing clear images from being observed. Accordingly, the present invention includes the process of attaching the protective film 106 onto the micro-lens array 102 in order to prevent the above problem (see FIG. 1). The protective film 106 is attached to the micro-lens array 102, and functions to protect lenses from external heat and pressure. In this case, the protective film 106 is made of heat-resistant material, thereby minimizing the influence of heat. The protective film 106 is removed from the three-dimensional security element when the three-dimensional security element has been attached to the injection-molded product and a final result has been obtained.

In order to attach the three-dimensional security element according to the present invention to the injection-molded product, an in-mold injection method is used. The in-mold injection method has a few advantages compared to other methods. These advantages include: the flexibility of design, the implementation of multiple colors, a three-dimensional effect and texture by means of a single task, manufacturing productivity attributable to long-lasting graphics, and a reduction in system cost.

In-mold injection is performed in the sequence of the transmission of a base material, the fixing of the base material, the injection of a material, and the removal of a product. The three-dimensional security element is placed inside the mold, and a resin is injected when the mold is closed, and then an injection-molded product is produced by heat and pressure. In this case, the three-dimensional security element and the injection-molded product are produced in an integrated form.

The primer layer 105 formed on the opposite surface of the base material functions to enhance adhesive strength between the injection-molded product and the three-dimensional security element, and the protective film 106 located on the micro-lens array 102 functions to minimize the deformation of the micro-lenses attributable to injection temperature and pressure.

According to the three-dimensional security element fabricated as described above, the images formed by the micro-lenses are viewed as being enlarged, and may be viewed as being present below a reference plane (a sinking effect) or as being above the reference surface (a floating effect) depending on design conditions. Furthermore, as a viewing angle moves, the focuses of the micro-lenses move, and thus the images are viewed as moving.

The array pitches or array periods of the micro-image array and the micro-lens array are designed to have varying values according to the type of three-dimensional effect to be implemented. Furthermore, the matching angle between the micro-image array and the micro-lens array has a varying value according to the type of three-dimensional effect to be implemented. A matching angle is an angle between the micro-lens array and the image array. When the matching angle is 0, the two arrays are in a parallel state. In contrast, when the matching angle is not 0, the two arrays are not parallel with each other but form a certain angle with respect to each other.

Three-dimensional effects include a sinking effect in which a moiré-magnified image is viewed as being present below the surface of the three-dimensional security element; a floating effect in which a moiré-magnified image is viewed as protruding from the three-dimensional security element; a rotation effect in which the above two effects alternate with each other depending on the direction of observation; and a reverse parallax effect in which a moiré-magnified image is not viewed as being three dimensional but as moving in a direction opposite to the direction in which tilting is performed.

The design conditions of the micro-lens array and the image array for respective visual effects are, as follows:

Reverse parallax effect: $P_{MIA}=P_{GIA}$, and $\Phi \neq 0°$

Sinking effect: $P_{MIA}>P_{GIA}$, and $\Phi=0°$

Floating effect: $P_{MIA}<P_{GIA}$, and $\Phi=0°$ (1)

In the above equation, $P_{MIA}$ is the period of the micro-lens array, $P_{GIA}$ is the period of the image array, and $\Phi$ is the matching angle between the micro-lens array and the image array. The case where the matching angle $\Phi$ is 0 indicates that the micro-lens array and the image array are in a parallel state, and the case where the matching angle $\Phi$ is not 0 indicates that the micro-lens array and the image array are not parallel with each other but form a certain angle with respect to each other.

Referring to Equation 1, when the micro-lens array and the image array have the same period and are not parallel with each other, the three-dimensional security element has a reverse parallax effect. When the two arrays are parallel with each other, the three-dimensional effect is determined based on the ratio between the periods of the two arrays. When the period of the micro-lens array is longer than the period of the image array, a sinking effect is exhibited. When the period of the micro-lens array is shorter than the period of the image array, a floating effect is exhibited.

In order to achieve a desired three-dimensional effect, the ratio of the period of the micro-lens array to the period of the image array should vary within the range from about 0.9 to about 1.1 because the difference between the period of the micro-lens array and the period of the image array is actually slight. In the case of a sinking effect, when the ratio of the period of the micro-lens array to the period of the image array is about 0.995, an optimum effect is exhibited. In the case of a floating effect, when the ratio is about 1.005, an optimum effect is exhibited.

The embodiment of the three-dimensional security film based on the above description is contrived for the purpose of being applied to a plane object. When this type of three-dimensional security film is applied to a curved object, a moiré-magnified three-dimensional image is not desirably viewed. In order to apply the three-dimensional security film according to the present invention to a curved object, implementation can be achieved via a design made by taking into account the curvature of a curved surface.

When the three-dimensional security film according to an embodiment is affixed to a curved object, the periods or pitches of the micro-lens array and the micro-image array are slightly increased because the three-dimensional security film is curved based on the curvature of the curved object. Furthermore, since the distance between the micro-image array and the micro-lens array is provided to adjust the focal distance of the micro-lens array, the pitch of the micro-lens array is always longer than the pitch of the micro-image array on a curved surface. The difference between the pitch of the micro-lens array and the pitch of the micro-image array is calculated using Equation 2:

$$p = \frac{r+t}{r} \qquad (2)$$

In the above equation, p is the difference between the pitches of the two arrays, r is the curvature radius of the curved object to which the security element will be affixed, and t is the distance between the micro-image array and the micro-lens array, which corresponds to the thickness of the base film. The three-dimensional security film that exhibits a three-dimensional image in a curved state can be fabricated by designing the pitches of the micro-lens array and the micro-image array in a reverse manner based on the above geometrical conditions. The curved three-dimensional security film designed based on the above conditions does not exhibit a moiré-magnified three-dimensional image in a plane state, but exhibits a moiré-magnified three-dimensional image in a state to which a curved surface has been applied.

The injection-molded product having the three-dimensional security element implements moiré-magnified three-dimensional images that are viewed as being present below a reference surface. Furthermore, a dynamic effect that allows three-dimensional images to be viewed as moving according to a viewing angle is implemented. Furthermore, with regard to the image highlighting method and the primer application process, products having various colors may be implemented using various colors and special materials.

The above-described injection-molded product having a three-dimensional security element may be applied to various fields ranging from mobile devices, such as mobile phones, to home appliance products and precision parts. The technology according to the present invention enables whether or not a product is a genuine product to be easily determined by adding a special three-dimensional effect to the appearance of an injection-molded product. Thanks to this feature, the technology can highly contribute to the protection of brands. Furthermore, when the technology is applied to an injected card, whether or not the card is genuine can be easily determined using unassisted vision, and thus the technology can contribute to the prevention of the forgery of cards.

The invention claimed is:

1. A method of producing an injection-molded product, comprising:
    a three-dimensional security element fabrication step of fabricating a three-dimensional security element in which a micro-lens array and an image array are disposed on opposite surfaces of a base material;
    a primer coating step of forming a primer layer on the image array;
    a protective film affixation step of affixing an outermost layer of protective film onto a top surface of the micro-lens array, wherein the protective film is made of heat resistant material and protects the micro-lens array from heat and pressure applied in an injection process;
    an injection molding step of producing an injection-molded product having a predetermined shape using the three-dimensional security element via an in-mold injection process, wherein the protective film is attached to the surface of the micro-lens array during the injection molding step; and
    a protective film removing step of removing the protective film from the three-dimensional security element.

2. The method of claim 1, further comprising, before the primer coating step, an image array highlighting step of filling the image array with ink or depositing ink on the image array.

3. The method of claim 1, wherein the three-dimensional security element is affixed to the injection-molded product using an in-mold injection process.

4. An injection-molded product to which the three-dimensional security element is affixed fabricated using the method of claim 1.

5. The injection-molded product of claim 4, wherein the three dimensional security element can be affixed to a curved object, and a pitch of the micro-lens array and a pitch of the image array are designed based on a curvature radius of the curved object and a distance between the micro-lens array and the image array, respectively.

6. The injection-molded product of claim 4, wherein the micro-lens array is of refractive, diffractive and Gradient Index (GRIN) types.

7. The injection-molded product of claim 4, wherein the primer layer is formed of resin including one or more selected from the group consisting of fluorescent ink, infrared ink, magnetic ink, phosphorescent ink, and color shifting ink.

8. The injection-molded product of claim 4, wherein the three dimensional security element and the injection-molded product are integrated with each other.

* * * * *